United States Patent [19]

Shriner

[11] 4,255,665

[45] Mar. 10, 1981

[54] WEARABLE DEVICE FOR MONITORING MOMENTARY PRESENCE OF INTENSE X-RAY AND/OR ULTRA-VIOLET RADIATIONS

[76] Inventor: Walter Shriner, 1409 Stevenson Dr., Springfield, Ill. 62703

[21] Appl. No.: 115,604

[22] Filed: Jan. 28, 1980

Related U.S. Application Data

[63] Continuation-in-part of Ser. No. 962,244, Nov. 20, 1978, abandoned.

[51] Int. Cl.$^3$ .............................................. G01J 1/58
[52] U.S. Cl. ..................................... 250/483; 250/486
[58] Field of Search ............... 250/458, 462, 465, 472, 250/473, 474, 372, 483, 486

[56] References Cited

U.S. PATENT DOCUMENTS

| | | | |
|---|---|---|---|
| 2,459,694 | 1/1949 | Gordon | 250/486 |
| 2,509,766 | 5/1950 | Gross | 250/473 |
| 2,616,051 | 10/1952 | Daniels | 250/486 |
| 2,949,880 | 8/1960 | Fromer | 250/474 |
| 3,194,963 | 7/1965 | McKee | 250/473 |
| 3,597,054 | 8/1971 | Winter | 250/474 |

*Primary Examiner*—Bruce C. Anderson

*Attorney, Agent, or Firm*—Ralph F. Staubly

[57] ABSTRACT

A credit-card-size clear-plastic-encased device which can be worn or carried by a person to warn him of the momentary presence of dangerous intensitives of ultra-violet and/or X-ray radiations. A base lamina (e.g. of cardboard) is coated with a material (e.g. zinc-cadmium sulfide or lead-barium sulfate) which fluoresces under such radiations. Numerals, letters, words or symbols are printed over the fluorescent coat with a material inhibitory to said radiations so that a warning message in dark print will appear on a light background when dangerous intensities of said radiations are present. An X-ray-warning area is covered with an ultra-violet absorbing screen so that said area will glow only under X-rays (which rays will also activate the remaining ultra-violet-responsive area). The colors of the laminas and the coats are so selected that the messages are not visible when dangerous radiations are not present. If desired, only the message can be printed with fluorescent material so as to glow on a darker background. Optionally, step-layer-attenuation devices can be added to indicate degrees of radiation; and reflecting surfaces can underlie the fluorescent coat to increase efficiency and/or sensitively.

14 Claims, 4 Drawing Figures

WEARABLE DEVICE FOR MONITORING MOMENTARY PRESENCE OF INTENSE X-RAY AND/OR ULTRA-VIOLET RADIATIONS

This application is a continuation-in-part of now-being-abandoned application Ser. No. 962,,244, filed Nov. 20, 1978 and entitled "Wearable Device for Monitoring X-Ray and/or UltraViolet Radiations".

BACKGROUND AND OBJECTS OF THE INVENTION

It is broadly old to employ a spot of material (U.S. Pat. to Winter No. 3,597,054, 8-3-71) fluorescent to ultraviolet radiations to warn persons of the presence of dangerous intensities of such radiations. It is also known to utilize such materials in relatively complicated meters (McKee U.S. Pat. No. 3,194,963) and dosimeters (Jubb U.S. Pat. No. 3,710,115). But it is not known to provide a very simple device capable of being worn by a person to give a printed-message warning of the momentary presence of dangerous intensities of one, two or more ranges of such radiations. It is the principal object of this invention to provide such a device. Other objects and advantages will appear as the following description proceeds.

BRIEF DESCRIPTIONS OF THE DRAWING FIGURES

DETAILED DESCRIPTION

Figure 1:
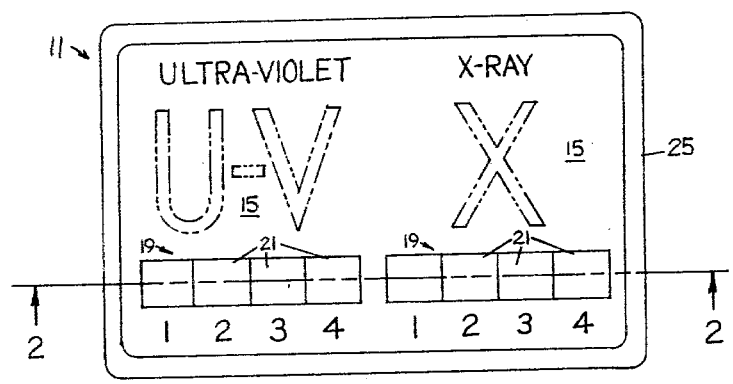
FIG. 1 is a plan view of a preferred embodiment of the invention.
Figure 2:
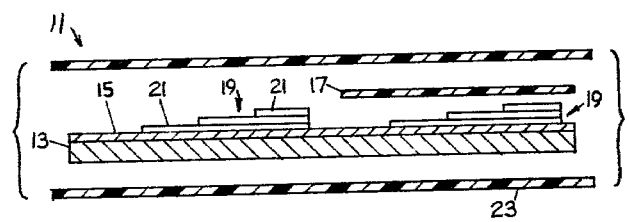
FIG. 2 is vertically expanded elevational view in section taken on the line 2—2 of FIG. 1.

With reference now to FIGS. 1 and 2, the numeral 11 generally designates a card for warning persons of the momentary presence of dangerous intensities of both ultra-violet and X-ray radiations and also of the degrees of said intensities. The device 11 comprises a base lamina 13 of cardboard or plastic material onto which has been laid or coated a layer 15 of fluorescent material. The material of the layer 15 can be any substance (e.g. lead-barium sulfate or zinc-cadmium sulfide) which glows either under X-rays or under ultra-violet radiations in the sunburn range. On the left half of the coat or layer 15 the message U-V is printed with an ink containing a substance inhibitory to ultra-violet rays (e.g. phenyl salicylate) so that when the layer 15 is U-V activated the message U-V will appear in dark lettering on a luminescent background. The ink containing the inhibitory substance will be of a color (e.g. yellow) closely matching that of the layer 15 so that the message will be substantially invisible under safe-radiations conditions. The legend "ULTRA-VIOLET" can either be similarly printed or be printed to show as dark lettering under all conditions.

The right half of the layer 15 is covered by a layer or coat 17 of a substance (e.g. phenyl salicylate) inhibitory (i.e. absorptive and/or reflective) to ultra-violet radiations so that the message X will be activated only by X-rays (which rays will also activate the U-V half of the fluorescent layer 15).

Each half of the layer 15 is desirably provided with steplayer-attenuation devices 19 of known constructions to indicate degrees of the radiations detected by the card 11. Each attenuation device 19 is formed by a plurality of stepped layers or coats 21, each containing materials partially inhibitory to the rays detected by its half of the card (e.g. phenyl salicylate for the U-V side and lead salts for the X side). Thus the blocked areas 1, 2,3,4 of each attenuation device 19 will be actuated serially as the intensity of its detected radiation increases: "1" for low, "12" or "123" for moderate and "1234" for high levels, respectively.

The base lamina 13 and its superposed elements 15-21 are encased between two waterproof and easily cleaned transparent plastic sheets 23, thermoplastically welded together or otherwise sealed along their margins 25.

Figure 3:
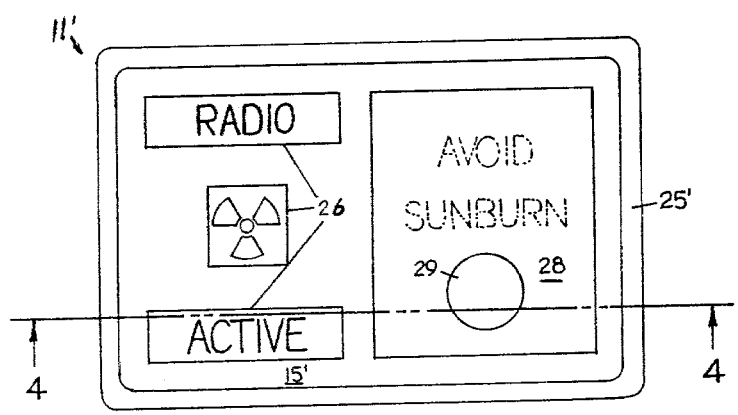
FIG. 3 is a plan view of a simplified form of the invention.
Figure 4:
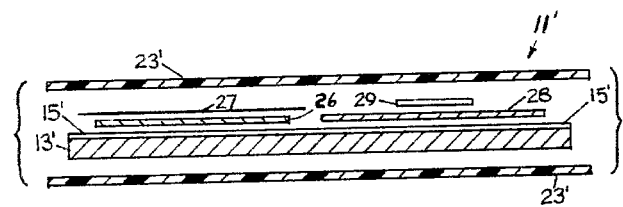
FIG. 4 is a vertically expanded elevational view in section taken on the line 4—4 of FIG. 3.

The simpler form of the invention disclosed in FIGS. 3 and 4 has its elements designated by primed numerals corresponding to parts bearing unprimed numerals in FIGS. 1 and 2. The layers or coats 26 may be formed of or printed with X-ray inhibiting material so as to show always as dark messages on a lighter (e.g. yellow) background that glows and thus brightens under X-ray activation. A light-transparent layer or coating 27 containing an ultra-violet-inhibiting substance overlies the layers 26 so that the X-ray messages of the elements 26 will not respond to ultra-violet radiations. The middle or symbol message 26 can be printed with an ink containing an X-ray inhibiting pigment and other pigments making it colorwise match the fluorescent coat 15', so as thus to be substantially invisible in the absence of X-rays.

The ultra-violet (right) half of card 11' has a layer or coating 15' containing a material fluorescent to the selected U-V range to be monitored. As in FIGS. 1 and 2, the coating may have printed thereon the message AVOID SUNBURN with an ink containing a substance inhibitory to ultra-violet radiation and pigments selected to make the ink match the layer 15' in color (e.g. yellow). But as shown in FIG. 4, the message can alternatively be printed on a transparent sheet 28. A disc 29 can be added to serve as an attenuating device similar to devices 19 previously described. The disc 29 could be divided into halves or fourths (not shown) differently coated with U-V-inhibiting materials so as to indicate degrees of intensity of the delected U-V radiations monitored.

While the device has been shown in the form of a card, it should be noted it could have a cylindrical or spherical base lamina, if desired.

The invention having been described, what is claimed is:

1. A device for warning persons of the momentary presence of dangerous intensities of at least two separate distinct ranges of radiant energies, comprising: a base lamina; material, fluorescent to said separate distinct ranges of radiant energies, positioned adjacent a surface of said base lamina in patterns defining separate visual message areas; and at least one material, inhibitory to at least one of said ranges of radiant energies, covering at least one message area to prevent a fluorescent message from emanating therefrom, whereby said warning device can at least partially identify the nature of radiant energies being detected.

2. A device according to claim 1, said base lamina being relatively flat.

3. A device according to claim 2, certain of said message areas being on opposite faces of said base lamina.

4. A device according to claim 3, said opposite faces of said base lamina being protectively covered by transparent laminas.

5. A device according to claim 2, at least the fluorescent-message face of said device being protectively covered by a transparent lamina.

6. A device according to claim 1, said base lamina being so shaped that the outlines of certain planar cross-sections thereof would define wide closed-line figures.

7. A device according to claim 1 with at least portions of at least one of said message areas being covered by attenuating inhibitory means to indicate varying intensities of the radiation detected.

8. A device according to claim 1, said messages being at least partly in the form of printed symbols.

9. A device according to claim 7, said messages being at least partly in the form of printed words.

10. A device according to claim 1, said message areas being covered by said fluorescent material and being printed-over by radiation-inhibiting substance to provide a dark message on a fluorescent background.

11. A device for warning persons of the momentary presence of dangerous intensities of certain radiant energies, comprising: a base lamina; material, fluorescent to at least one distinct range of potentially dangerous radiant energy, positioned over said base lamina so as to define a message in printed form thereon; and at least one lamina, transparent to said at least one distinct range of radiant energy and to the visible light to be emitted by said fluorescent material, protectively covering at least the message surface of said base lamina.

12. A device according to claim 11, said printed message being delineated by said fluorescent material on a background free of said material but matching said material colorwise so as to be substantially invisible under safe-radiations conditions.

13. A device according to claim 11, said base lamina having a message area covered by said material and said printed message being delineated by substance inhibitive to said radiant energy so as to provide a darker printed message on a fluorescent-lightened background when detectingly energized.

14. A device according to claim 13, said message area and said inhibitory substance being of substantially matching colors so that said printed message will be substantially invisible under safe-radiations conditions.

* * * * *